United States Patent
Lenz et al.

(10) Patent No.: US 7,047,110 B2
(45) Date of Patent: May 16, 2006

(54) METHOD AND APPARATUS FOR CONTROLLING A POWER SUPPLY

(75) Inventors: Rodney Lenz, Tempe, AZ (US); Gerard McSweeney, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/417,836

(22) Filed: Apr. 16, 2003

(65) Prior Publication Data

US 2004/0210349 A1   Oct. 21, 2004

(51) Int. Cl.
G05D 11/00 (2006.01)
(52) U.S. Cl. .................. 700/286; 323/322; 323/318
(58) Field of Classification Search ............. 700/286; 323/246, 322, 318; 713/340
See application file for complete search history.

(56) References Cited

U.S. PATENT DOCUMENTS

| | | | |
|---|---|---|---|
| 4,538,073 A * | 8/1985 | Freige et al. ............... 307/33 |
| 5,481,730 A * | 1/1996 | Brown et al. ............... 713/340 |
| 5,594,286 A * | 1/1997 | Tachikawa ................. 307/43 |
| 5,621,623 A * | 4/1997 | Kuriyama et al. .......... 363/20 |
| 5,917,719 A * | 6/1999 | Hoffman et al. ........... 363/84 |
| 6,430,070 B1 * | 8/2002 | Shi et al. ................... 363/97 |
| 6,710,621 B1 * | 3/2004 | Devlin et al. .............. 326/38 |
| 2002/0188383 A1 * | 12/2002 | Elek et al. ................ 700/297 |
| 2003/0006650 A1 * | 1/2003 | Tang et al. ................ 307/43 |
| 2003/0132668 A1 * | 7/2003 | Lanni ...................... 307/38 |
| 2004/0062058 A1 * | 4/2004 | Hann et al. ............... 363/15 |
| 2004/0070998 A1 * | 4/2004 | Deboes et al. ............. 363/28 |

* cited by examiner

Primary Examiner—Leo Picard
Assistant Examiner—Alexander Kosowski
(74) Attorney, Agent, or Firm—Blakely, Sokoloff, Taylor & Zafman LLP

(57) ABSTRACT

A method for controlling a power supply, the method comprising: forming a front-end to the power supply, the front-end comprising a plurality of digital-to-analog circuits under control of a controller; and programming the controller to control the digital-to-analog circuits to send a user-defined output reference voltage and a user-defined over voltage protection reference voltage to the power supply.

20 Claims, 3 Drawing Sheets

METHOD AND APPARATUS FOR CONTROLLING A POWER SUPPLY

FIELD OF THE INVENTION

This invention relates to programmable power supplies. In particular, the invention relates to a method and apparatus for controlling a programmable power supply.

BACKGROUND

Programmable power supplies refer to a class of power supplies whose output can be controlled or programmed via a control mechanism. Typically, the control mechanism comprises a controller which is operatively connected to the power supply via a general purpose interface bus (GPIB) or an analog input control port. The GPIB carries control signals from the controller to the programmable power supply. The control signals include voltage set point changes to control an output of the programmable power supply.

Sometimes there can be a delay of up to 400 milliseconds from transmission of a control signal over the GPIB to when a programmable power supply actually changes its output voltage in response to the control signal. This delay may be too long as there may be uses for programmable power supplies in which a faster change in the output voltage of the power supply is required.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
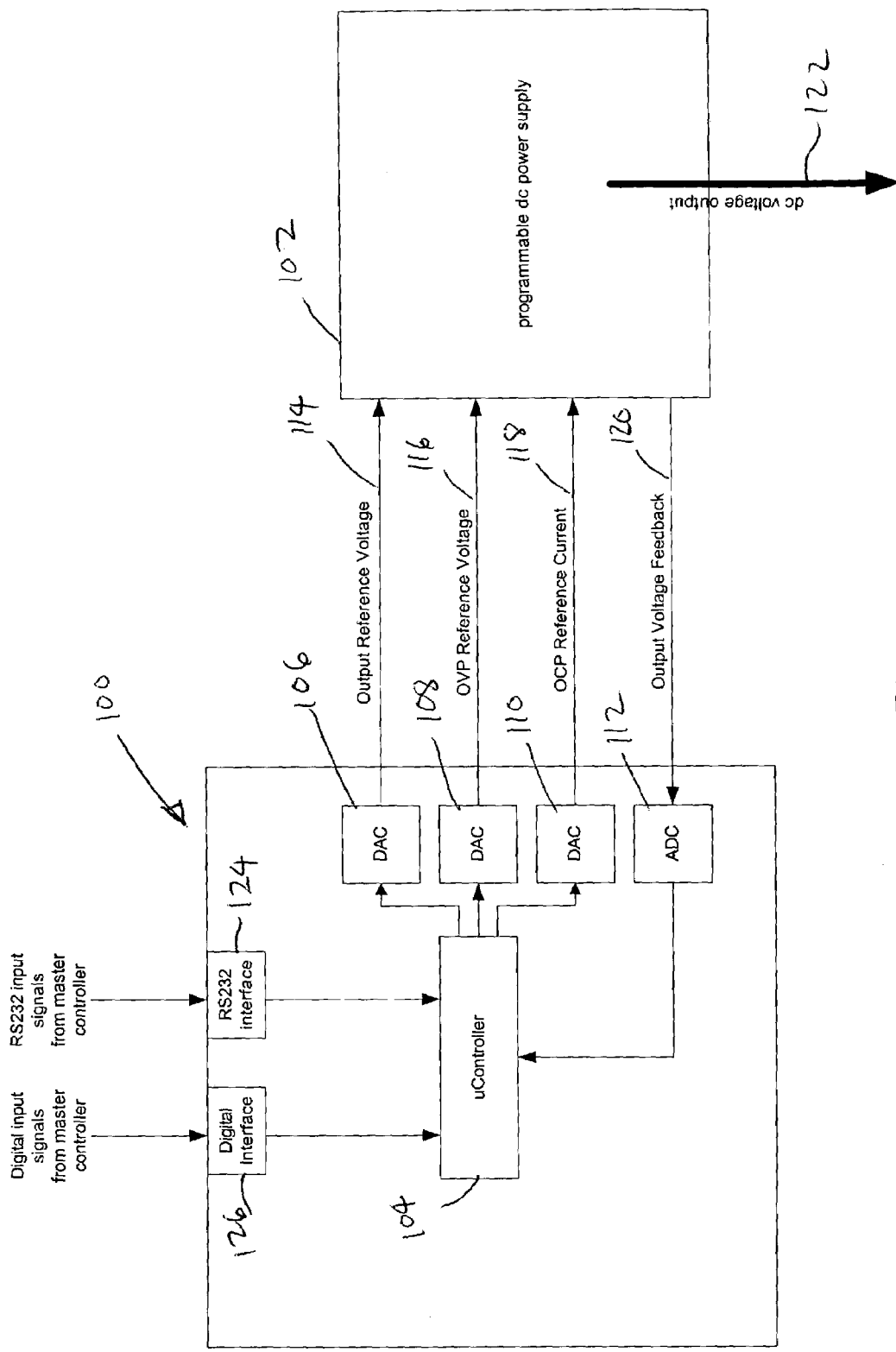
FIG. 1 shows a block diagram of an apparatus for controlling a programmable power supply, in accordance with one embodiment of the invention.

Referring to FIG. 1 of the drawings, reference numeral 100 generally indicates an apparatus in the form of a control unit to control a programmable power supply 102. The control unit 100 includes a microcontroller 104 which is connected to digital-to-analog (DAC) circuits 106, 108, and 110. The microcontroller 104 is also connected to an analog-to-digital circuit (ADC) 112.

The digital-to-analog circuit 106 sends an output reference voltage signal 114 to the power supply 102. The digital-to-analog circuit 108 sends an over voltage protection (OVP) reference voltage signal 116 to the programmable power supply 102. The digital-to-analog circuit 110 sends an over current protection (OCP) reference current signal 118 to the programmable power supply 102. The analog-to-digital circuit 112 receives an output voltage feedback signal 120 from the programmable power supply 102, converts the signal to a digital signal and sends the signal to the microcontroller 104.

In operation, the programmable power supply 102 uses the output reference voltage signal 114 and outputs a voltage signal 122 which has a voltage that corresponds to the output reference voltage signal 114. Typically, the voltage output signal 122 is sent to a device which requires power, for example a device under test.

The function of the digital-to-analog circuit 106 is to convert a digital value for an output reference voltage into the analog output reference voltage signal 114. The digital-to-analog circuit 106 receives the digital value for the output reference voltage from the microcontroller 104. In particular, the microcontroller 104 includes a register to store a digital value corresponding to the output reference voltage.

The control unit 100 also includes a first interface 124 which defines a mechanism to input data into the microcontroller 104. In particular, the interface 124 is used to program the register of the microcontroller 104 with the digital value for the output reference voltage. In one embodiment, the first interface 124 may be an RS232 interface which is configured to receive RS232 input signals from a master controller such as a computer terminal.

In one embodiment, the microcontroller 104 includes a plurality of registers, each to store a different value for the output reference voltage. Each of these registers is programmable via the first interface 124.

The control unit 100 also includes a second interface 126 which defines a mechanism to input digital control signals to the microcontroller 104. Typically, the digital control signal is sent from a control terminal or personal computer (pc) (not shown). In response to the digital control signal input into the microcontroller via interface 126, the microcontroller sends the digital values stored within a register indicated by the control signal to the digital-to-analog circuit 106 for conversion to the analog output reference voltage signal 114. In one embodiment, the microcontroller 104 sends the lowest value for the reference output voltage stored in one of its registers to the digital-to-analog circuit 106. Thereafter, upon each receipt of a digital control signal via interface 126, the microcontroller selects a next highest value for the output reference voltage from one of its registers and sends this value to the digital-to-analog circuit 106. It will be appreciated, that with this embodiment, the programmable power supply 102 can be made to output progressively different values for the voltage output signal 122.

Using the interface 124, the microcontroller 104 may be programmed with a value for an Over Voltage Protection (OVP) reference voltage. Typically, this value is stored in one of the registers within the microcontroller 104. In use, the microcontroller 104 sends the value for the over voltage protection reference voltage to the digital-to-analog circuit 108 which converts the value to the analog over voltage protection reference voltage signal 116. The programmable power supply 102 ensures that the output voltage output signal 122 does not exceed the OVP reference voltage signal 116.

One of the registers within the microcontroller 104 may be programmed with a value for an over current protection OCP reference voltage via the first interface 124. In use, the microcontroller 104 sends the value for the OCP reference voltage to the digital-to-analog circuit 110 which converts it to the OCP reference voltage signal 118. The programmable power supply 102 uses the OCP reference voltage signal 118 as a benchmark to limit the current output by the power supply 102.

The output voltage feedback signal 120 which is converted to a digital value by the analog-to-digital circuit 112 and fed to the microcontroller 104 as described above, is used by the microcontroller 104 to determine whether the output reference voltage signal 114 is to be increased to compensate for transmission losses. For example, if the microcontroller 104 determines that the digital value corresponding to the output voltage feedback signal 120 is less than the digital value corresponding to the current output reference voltage signal 114, then the microcontroller 104 increases the output reference voltage signal 114 to compensate for transmission losses in the output reference voltage signal 114. The net effect of this compensation is that the programmable power supply 102 outputs a voltage signal 122 which corresponds to the digital value for the output reference voltage signal 114 that is currently being output by the digital-to-analog circuit 106.

The components of control unit 100 downstream of the microcontroller 104 are referenced to a ground for the power supply 102 and can derive power from the power supply side. Interfaces 124 and 126 are referenced to a ground for microcontroller 104 and derives power from the master controller side.

In one embodiment, the digital-to-analog circuit 106 provides a 0–5 volt output.

In one embodiment, the control unit 100 comprises a single circuit board embedded within a protective enclosure. The control unit 100 may be mounted directly to the programmable power supply 102. In one embodiment, the overall dimensions of the control unit 100 may be approximately 5"×3"×0.5".

Figure 2:
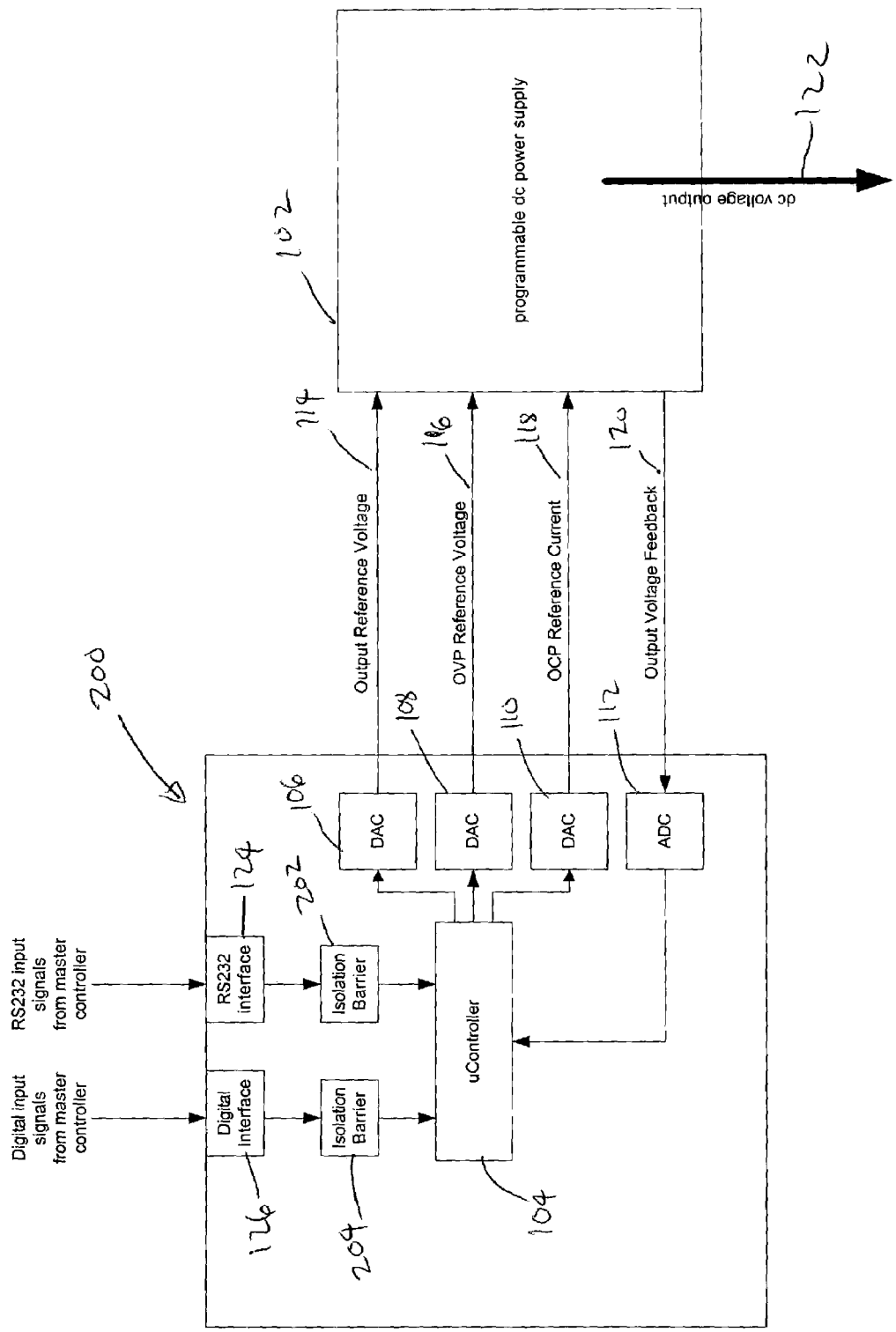
FIG. 2 shows a block diagram of another embodiment of the apparatus of FIG. 1.

Referring now to FIG. 2 of the drawings, reference numeral 200 shows a high-level block diagram of another embodiment of a control unit for controlling a power supply. The control unit 200 is similar to the control unit 100, and accordingly the same reference numbers have been used, wherever possible. One difference between the control unit 200 and the control unit 100 is that the control unit 200 includes isolation barriers 202 and 204 disposed between the first interface 124 and the microcontroller 104, and the second interface 126 and the microcontroller 104, respectively. The function of the isolation barriers 202 and 204 is to isolate the digital signals received from the interfaces 124, and 126, respectively from the microcontroller 104. This ensures that the microcontroller 104 receives a clean signal with minimal interference. In one embodiment, the isolation barriers 202, and 204 may operate to optically isolate the digital signals received from the interfaces 124, and 126, respectively, from the microcontroller 104.

Figure 3:
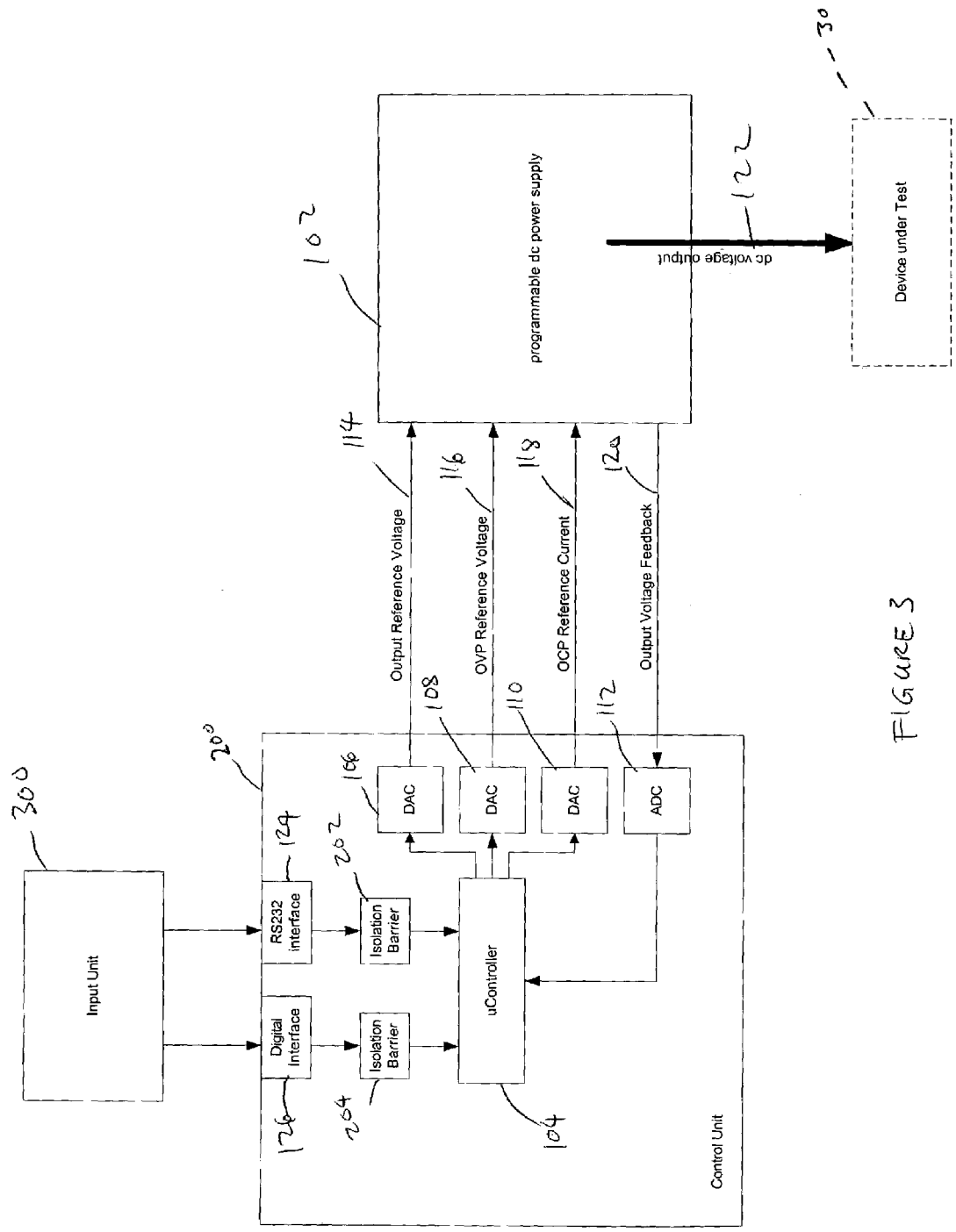
FIG. 3 shows a block diagram of a system in accordance with one embodiment of the invention.

In one embodiment, the controllers 100 and 200 of FIGS. 1 and 2, respectively may be connected to an input or control unit 300, as can be seen in FIG. 3 of the drawings. Typically, the input unit 300 may be a personal computer (pc) which provides a mechanism to program the microcontroller 104 via the interfaces 124, and 126, as described above. Thus, the input unit 300, and the controllers 100, and 200 form a system, in accordance with one embodiment of the invention. Also shown in FIG. 3 of the drawings, is a device under test 302 which is representative of a device which is required to be powered by the programmable power supply 102.

As will be seen from the above description, the control unit 100, and 200 form a front-end to the power supply 102, which front-end comprises a number of digital-to-analog circuits under control of the microcontroller 104. Further, as described above, the microcontroller 104 may be programmed via the input unit 300 to send a user-defined output reference voltage and a user-defined over voltage protection reference voltage to the power supply 102.

As noted above, with GPIB busses, latencies of up to 400 milliseconds from a voltage change command to when the voltage output change occurs may be observed. In one embodiment, the control units 100, and 200 reduce these latencies to less than 7 milliseconds.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method for controlling a power supply, the method comprising:

forming a front-end to the power supply, the front-end comprising a plurality of digital-to-analog circuits under control of a controller;

programming the controller to control the digital-to-analog circuits to send a user-defined output reference voltage and a user-defined over voltage protection reference voltage to the power supply;

wherein programming the controller comprises sending a data signal which includes the user-defined output reference voltage to the controller;

wherein the data signal comprises several user-defined output reference voltages; and controlling the digital-to-analog circuit that sends the output reference voltage to send each of the user-defined output reference voltages at a predetermined time to the power supply.

2. The method of claim 1, further comprising programming the controller to control the digital-to-analog circuits to send a user-defined over current clamping protection reference current to the power supply.

3. The method of claim 1, wherein programming the controller comprises sending a data signal which includes the user-defined over voltage protection reference voltage to the controller.

4. The method of claim 1, further comprising monitoring an output voltage of the power supply.

5. The method of claim 4, further comprising controlling the digital-to-analog circuit that senses the voltage output to send an increased output reference voltage to the power supply if the voltage output is less than the sensed output reference voltage.

6. The method of claim 1, wherein the predetermined time is based on a control signal sent to the controller.

7. The method of claim 6, further comprising isolating the control signal and the data signal before sending the control signal and the data signal to the controller.

8. Apparatus for controlling a power supply, the apparatus comprising:

a first digital-to-analog circuit to send a user-defined output reference voltage to the power supply;

a second digital-to-analog circuit to send a user-defined over voltage protection reference voltage to the power supply;

a controller to control the first and second digital-to-analog circuits, the controller having a memory to store the user-defined output reference voltage, and the user-defined over voltage protection reference voltage;

a first interface to the controller defining a mechanism to input data to the controller, including the user-defined output reference voltage and the user-defined over voltage protection reference voltage;

wherein the controller stores several user-defined output reference voltages and controls the first digital-to-analog circuit and sends each of the several user-defined output reference voltages to the power supply at a predetermined time.

9. The apparatus of claim 8, further comprising a third digital-to-analog circuit to send a user-defined over current protection reference current to the power supply, wherein the controller further stores the user-defined over current protection reference current and controls the third digital-to-analog circuit, and wherein the user-defined over current protection reference current is input into the controller via the first interface.

10. The apparatus of claim 8, wherein the predetermined time is based on a timing signal received from a master controller.

11. The apparatus of claim 10, wherein the controller has a second interface through which the timing signal from the master controller is received.

12. The apparatus of claim 11, further comprising an isolation barrier to isolate signals to the controller from the first and second interfaces.

13. The apparatus of claim 8, further comprising an analog-to-digital converter which converts an output voltage from the power supply into a digital signal to the controller.

14. The apparatus of claim 13, wherein the controller compares the output voltage from the power supply with the output reference voltage of the first digital-to-analog circuit, and adjusts the output voltage of the first digital-to-analog circuit if there is a difference.

15. The apparatus of claim 14, wherein the controller adjusts the output voltage of the first digital-to-analog circuit by increasing the output reference voltage of the first digital-to-analog circuit by an amount equal to the difference.

16. A system for controlling a power supply, the system comprising:

a control unit to control the power supply, the control unit comprising a first digital-to-analog circuit to send several user-defined output reference voltages to the power supply at a predetermined time; a second digital-to-analog circuit to send a user-defined over voltage protection reference voltage to the power supply; a controller to control the first and second digital-to-analog circuits, a memory to store several of the user-defined output reference voltages, and the user-defined over voltage reference protection reference voltage; and a first interface to the controller defining a mechanism to input data to the controller including the user-defined output reference voltages and the user-defined over voltage protection reference voltage; and an input unit to input the user-defined output reference voltages and the user-defined over voltage protection reference voltage to the controller via the first interface.

17. The system of claim 16, wherein the control unit further comprises a third digital-to-analog circuit to send a user-defined over current protection reference voltage to power supply, wherein the memory further stores the user-defined over current protection reference voltage and the controller controls the third digital-to-analog circuit, and wherein the user-defined over current protection reference voltage is input into the memory via the first interface.

18. The system of claim 17, further comprising a master controller, wherein the predetermined time is based on a timing signal received from the master controller.

19. The system of claim 18, wherein the controller further comprises a second interface through which the timing signal from the master controller is received.

20. The system of claim 19, further comprising an isolation barrier to isolate signals to the controller from the first and second interfaces.

* * * * *